(12) United States Patent
Piazza

(10) Patent No.: US 6,347,713 B1
(45) Date of Patent: Feb. 19, 2002

(54) MULTILEVEL MODULAR STORAGE SYSTEM WITH MODULES SLIDING HORIZONTALLY IN BOTH DIRECTIONS

(76) Inventor: Antonio Piazza, Via Tuzzi 87, 36015 Schio (IT)

( * ) Notice: Subject to any disclaimer, the term of this patent is extended or adjusted under 35 U.S.C. 154(b) by 25 days.

(21) Appl. No.: 09/688,704

(22) Filed: Oct. 17, 2000

(30) Foreign Application Priority Data

Oct. 28, 1999 (IT) .......................................... PD99A0239

(51) Int. Cl.[7] .............................................. A47F 3/08
(52) U.S. Cl. ..................................................... 211/1.57
(58) Field of Search ............................... 211/1.57, 187, 211/175, 60.1, 1.51

(56) References Cited

U.S. PATENT DOCUMENTS

| | | | |
|---|---|---|---|
| 3,730,358 A | * 5/1973 | Oji | 211/1.57 |
| 3,770,147 A | * 11/1973 | Kito et al. | 211/187 |
| 4,307,922 A | * 12/1981 | Rhodes, Jr. | 211/1.57 |
| 4,467,924 A | * 8/1984 | Morcheles | 211/1.57 |
| 4,941,578 A | * 7/1990 | Devening | 211/187 |
| 5,333,983 A | * 8/1994 | Hatouchi et al. | 211/1.57 |

FOREIGN PATENT DOCUMENTS

| | | |
|---|---|---|
| DE | 307 379 | 8/1918 |
| DE | 296 00 835 | 4/1997 |
| FR | 2 180 995 | 11/1973 |

* cited by examiner

Primary Examiner—Alvin Chin-Shue
Assistant Examiner—Sarah Purol
(74) Attorney, Agent, or Firm—Duido Modiano; Albert Josif; Daniel O'Byrne

(57) ABSTRACT

A multilevel modular storage system composed of a plurality of modules arranged side by side and stacked on a plurality of levels which can slide horizontally and transversely in both directions. Each module has a substantially rectangular elongated supporting base. A first end of each one of the modules can slide on sliders which are rigidly coupled to a wall, while the other end is supported by vertical uprights which are substantially shaped like an inverted L and rest on a floor rail. The entire storage system has a motor drive which allows the translatory motion of the modules of each level so as to provide top and/or front access to the item of interested, both for loading and unloading the products to be stored or removed.

14 Claims, 8 Drawing Sheets

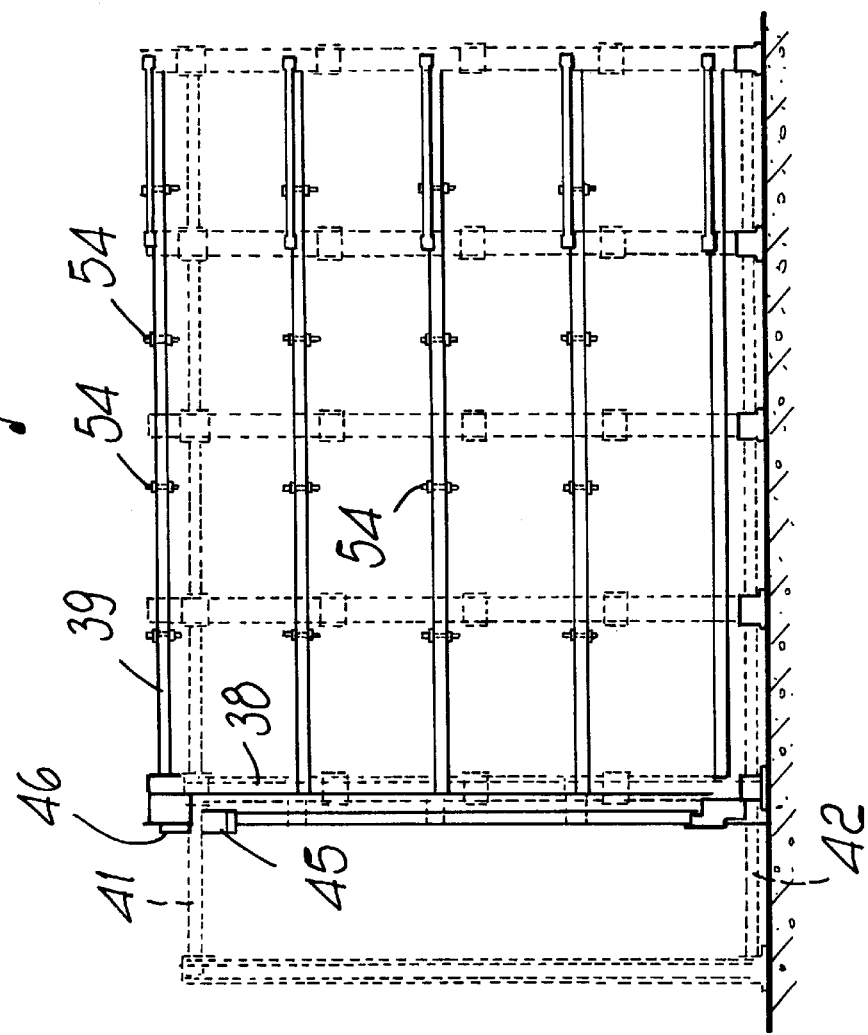
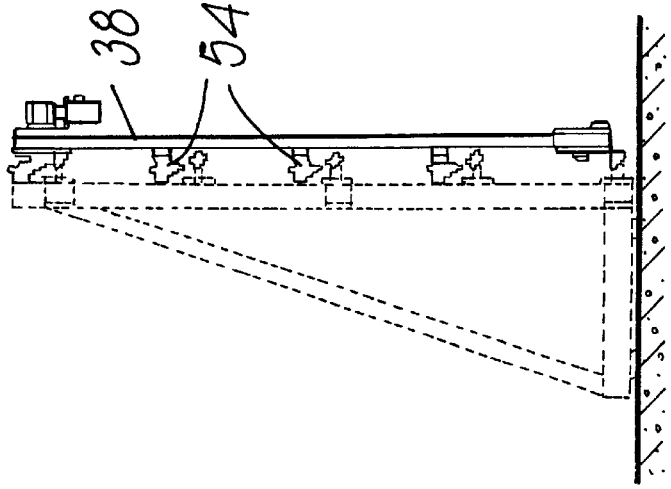

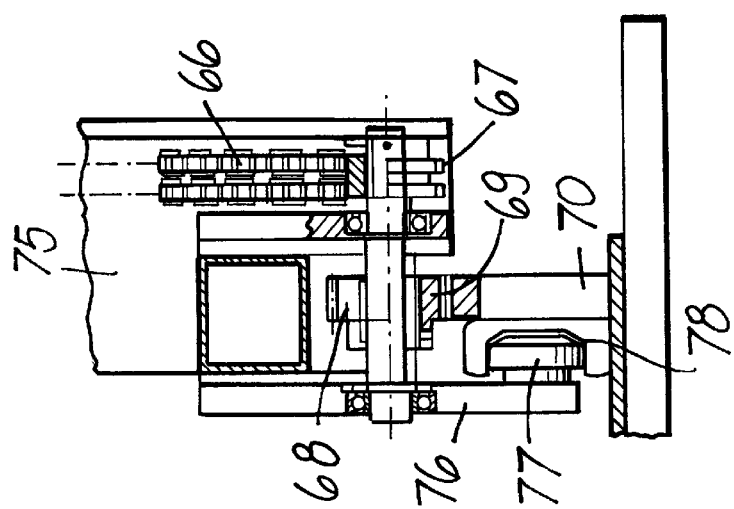
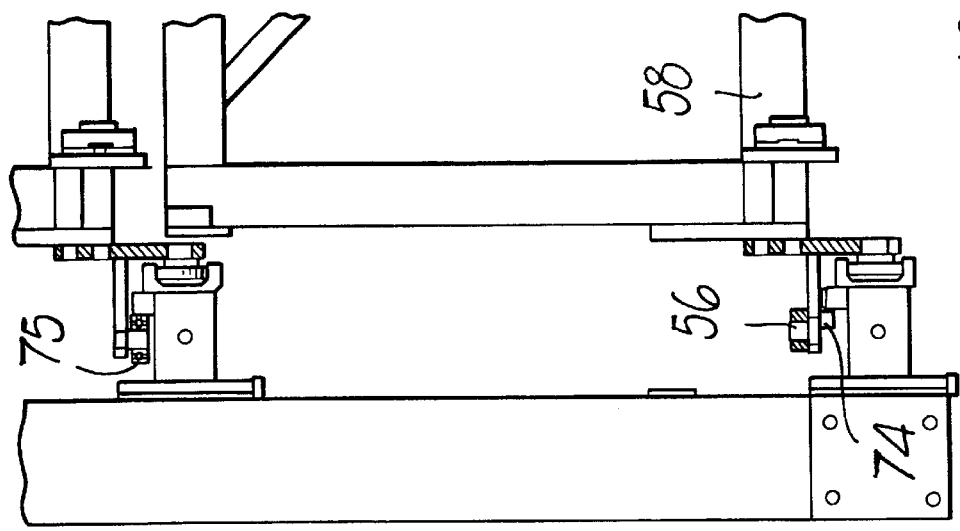
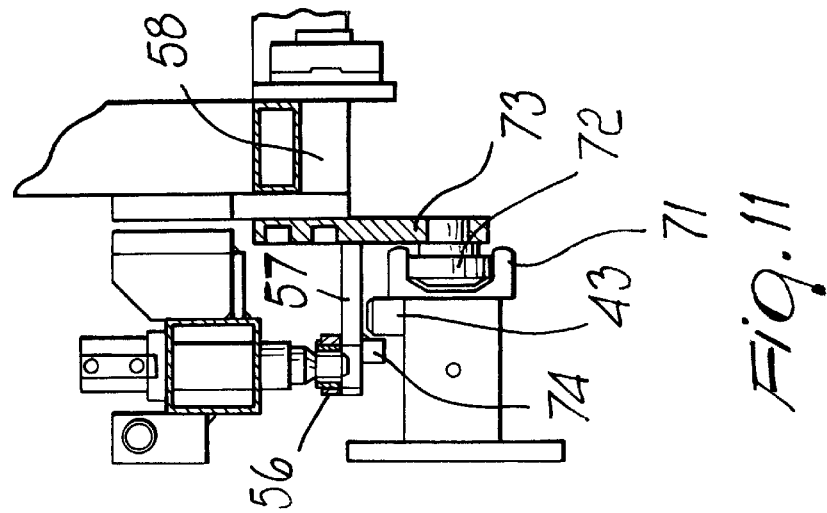

MULTILEVEL MODULAR STORAGE SYSTEM WITH MODULES SLIDING HORIZONTALLY IN BOTH DIRECTIONS

BACKGROUND OF THE INVENTION

The present invention relates to a multilevel modular storage system with modules which can slide horizontally in both directions and is adapted to store goods and/or items of different kinds, ranging from bundles of tubes, profiles, drawn parts made of metal rod (elongated products) to any loose or packaged object of compact dimensions, alone or grouped in multiple packages.

The problems of storage systems for raw materials, semi-finished parts or even finished parts are well-known.

One of the main problems suffered by these structures is their considerable bulk, with scarcely efficient utilization of the space available.

This situation is more evident when it is necessary to store tubes or profiles which have a highly elongated shape.

Usually, this material is stored in vertical or slightly inclined racks or in vertical structures having horizontal shelves (cantilevers), but this makes it difficult to have multiple rows of different products, since both movements for loading incoming product and for removing the product to be used is not easy.

Moreover, a storage system of this type is not suited for storing rods or pipes which are long but have a small cross-section and tend to sag under their own weight when they are arranged vertically even if they are tied in bundles.

It is preferable to arrange such products horizontally so that they rest on a surface.

This storage system, however, requires very large spaces owing to the need to have access corridors between the racks and is not versatile, i.e., it is not adapted to contain products of a different type.

SUMMARY OF THE INVENTION

The aim of the present invention is to provide a multiple modular storage system which solves the above-described problems.

Within the scope of this aim, an object of the present invention is to provide a storage system which allows to store highly elongated products.

Another object is to provide a storage system which is capable of containing the products in a plurality of modules which are arranged side by side and stacked so as to optimize utilization of the space available, eliminating the corridors.

Another object is to provide a storage system whose structure is simple and easy to manage.

These and other objects which will become better apparent hereinafter are achieved by a multilevel modular storage system with modules which can slide horizontally in both directions, characterized in that it comprises a plurality of stacked levels of independent modules arranged side by side, each module having a substantially rectangular elongated shape, said modules being supported, at a first end, by carriages slideable on sliders which are rigidly coupled to a wall and, at the other end, by vertical uprights which are shaped like an inverted L and rest movably on a ground rail, movement means for the translatory motion of said modules being further provided.

BRIEF DESCRIPTION OF THE DRAWINGS

Further characteristics and advantages of the present invention will become better apparent from the following detailed description of some embodiments thereof, illustrated only by way of non-limitative example in the accompanying drawings, wherein:

FIG. 7 is a side view of the means for the translatory motion of the modules;

FIG. 8 is a front view of the means for the translatory motion of the modules;

FIG. 11 is a detail view of the means for the translatory motion of the modules;

FIG. 12 is a detail view of the safety systems provided in the ends on the wall side;

FIG. 13 is a view of the means for supporting and moving the ground supports of the modules.

DESCRIPTION OF THE PREFERRED EMBODIMENTS

Figure 1:
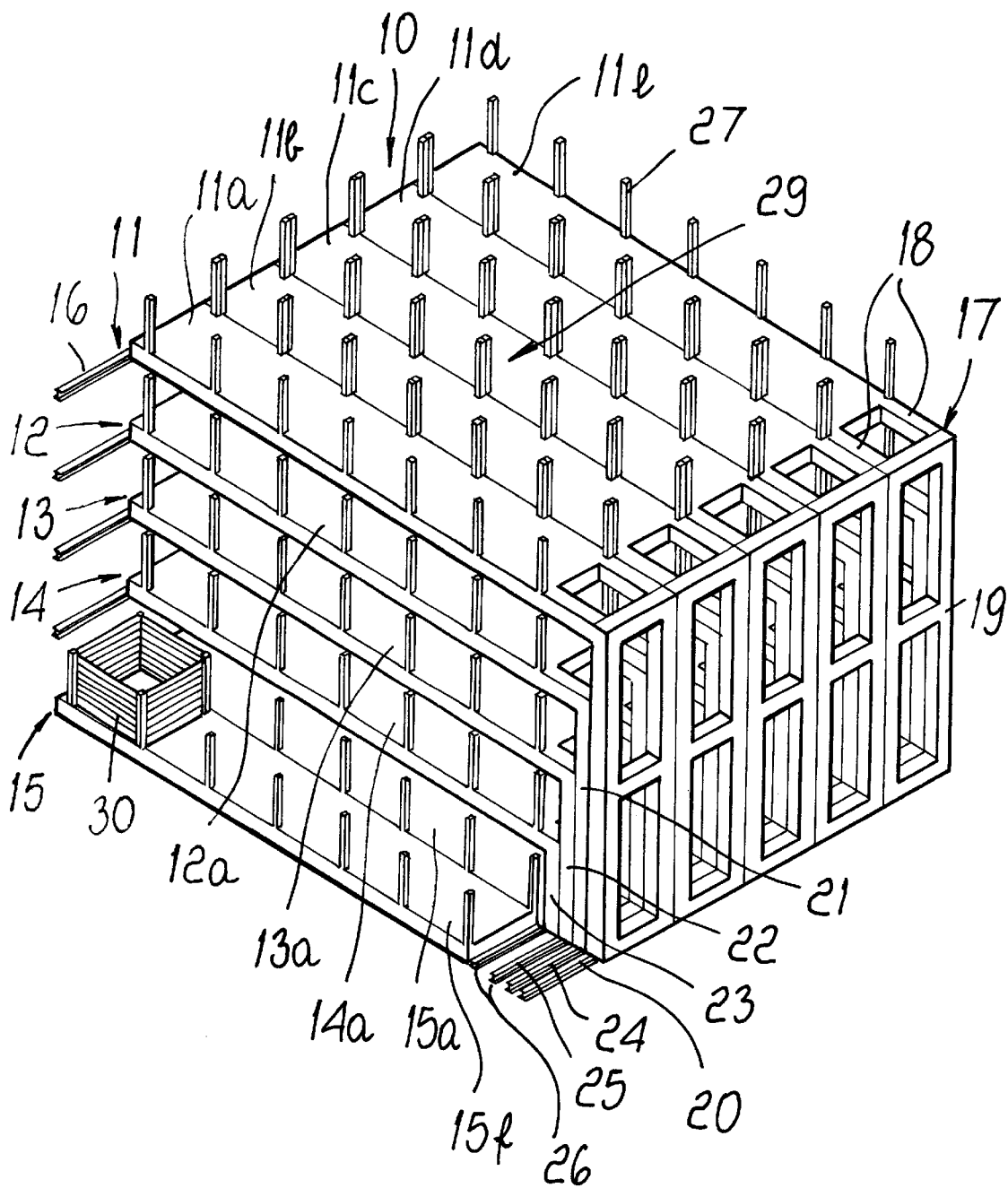
FIG. 1 is a perspective view of a multilevel modular storage system according to the present invention.

With reference to the figures, the storage system according to the invention is generally designated by the reference numeral 10 in FIG. 1.

Such figure illustrates the storage system that expresses the basic concept, while embodiments thereof are illustrated further on.

In this case, the storage system 10 is composed of five stacked levels, whose planes of arrangement are designated by the reference numerals 11 to respectively.

Each one of the levels is composed of a plurality of modules arranged side by side, designated by the reference numerals 11a, 11b, 11c, 11d and 11e for the level 11, while as regards the underlying levels the figure shows the modules 12a, 13a, 14a and, as regards the level 15, the module 15a and an additional external module 15f.

The modules of the level 15 are fixed and rest on the ground, while the modules of all the other levels are supported and perform translatory motions.

In particular with reference to the modules of the level 11, such modules are supported at their ends, so that they can slide as explained hereinafter, by a rail 16 which is fixed to a wall, not shown in the drawing.

With reference to the module 11e, which is in any case identical to all the other ones of the same level 11, said module has, on the opposite side with respect to the rail 16, an inverted L-shaped support 17 having protrusions 18 which constitute the upper wing of the inverted L and an upright 19 which is rigidly coupled to the protrusions 18 and has, on the ground, sliding and supporting means acting on a rail 20 which is fixed to the ground.

The modules of the underlying levels also have an inverted L-shaped supporting element, which is similar to the one already described and is designated by the reference numeral 21 for the level 12, 22 for the level 13, and 23 for the level 14.

The inverted L-shaped supports have such dimensions that each one lies, without interference, below the ones that support the modules of the overlying levels.

In the illustrated case, the supports 21 are mounted on the ground on a rail 24, the supports 22 are mounted on a rail 25, and the supports 23 rest on a rail 26, all said rails being parallel one another and fixed to the ground.

The products to be stored are arranged on the modules, which can have lateral containment elements 27; the products can be elongated, such as the ones shown by the outline 29, or in crates, such as ones shown by the outline 30; it is in any case evident that products of any kind can be introduced in the modules, provided that their dimensions do not protrude.

Figure 2:
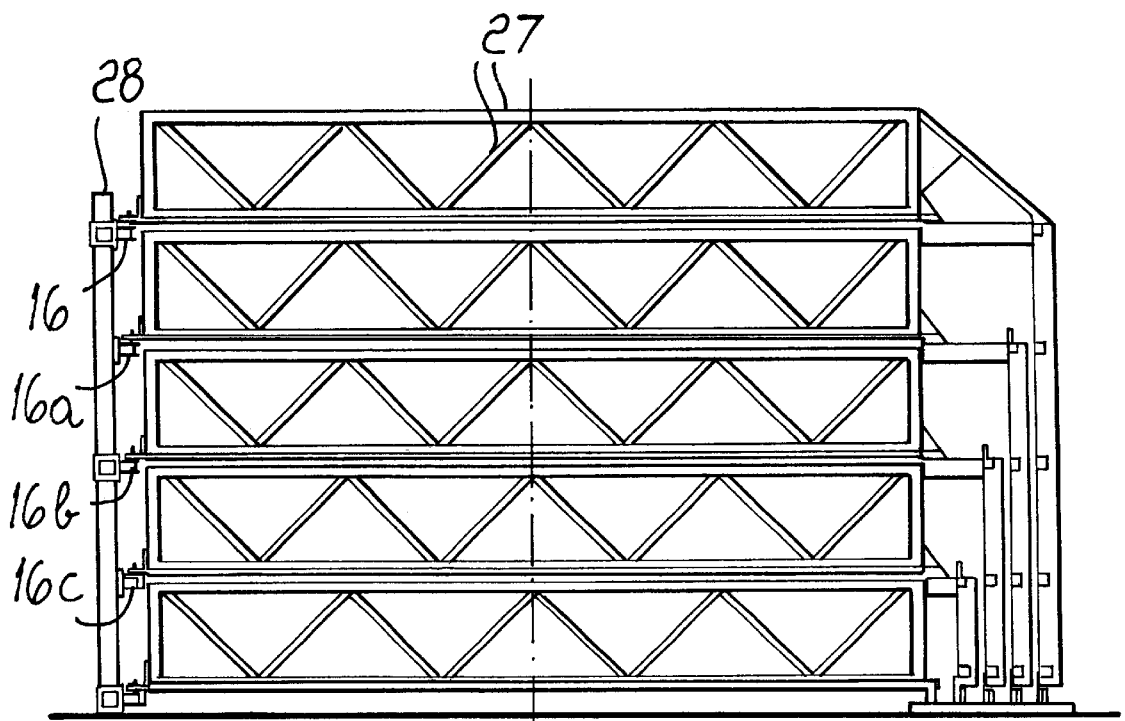
FIG. 2 is a side view of the storage system of FIG. 1.

FIG. 2 is a side view of a storage system of the type designated by the reference numeral 10 in FIG. 1, the only difference being that each module, designated by the same reference numerals in the figure, has lateral containment elements, designated by the reference numeral 27. This figure shows that the rail 16 and the rails that by analogy are designated by the reference numerals 16a, 16b and 16c are supported by vertical uprights 28 which can be self-supporting or are preferably rigidly coupled to a wall, not shown.

Figure 3:
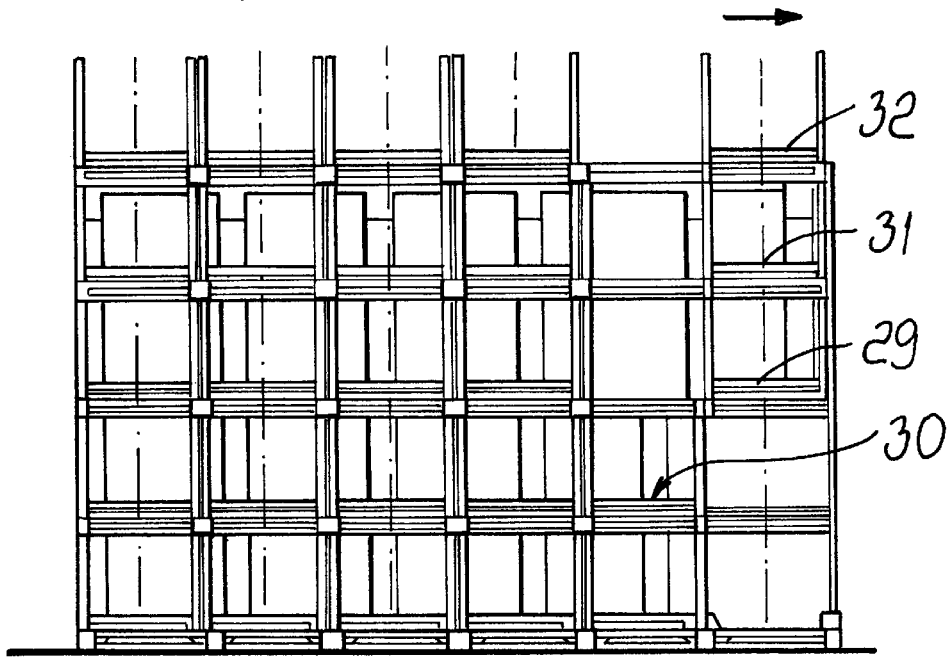
FIG. 3 is a front view of the storage system of FIG. 1.

FIG. 3 is a diagram of the translatory motion of the modules, which allows to highlight the module, now designated by the reference numeral 29, to which access from above is allowed after performing the translatory motion of the modules 30, 31 and 32 that were normally arranged above it.

The possibility of independent movement by way of devices described hereinafter allows to provide access from above, or even frontally in the version of FIG. 1, for example by means of a bridge crane, to any one of the modules and therefore to the materials stored therein.

Figure 4:
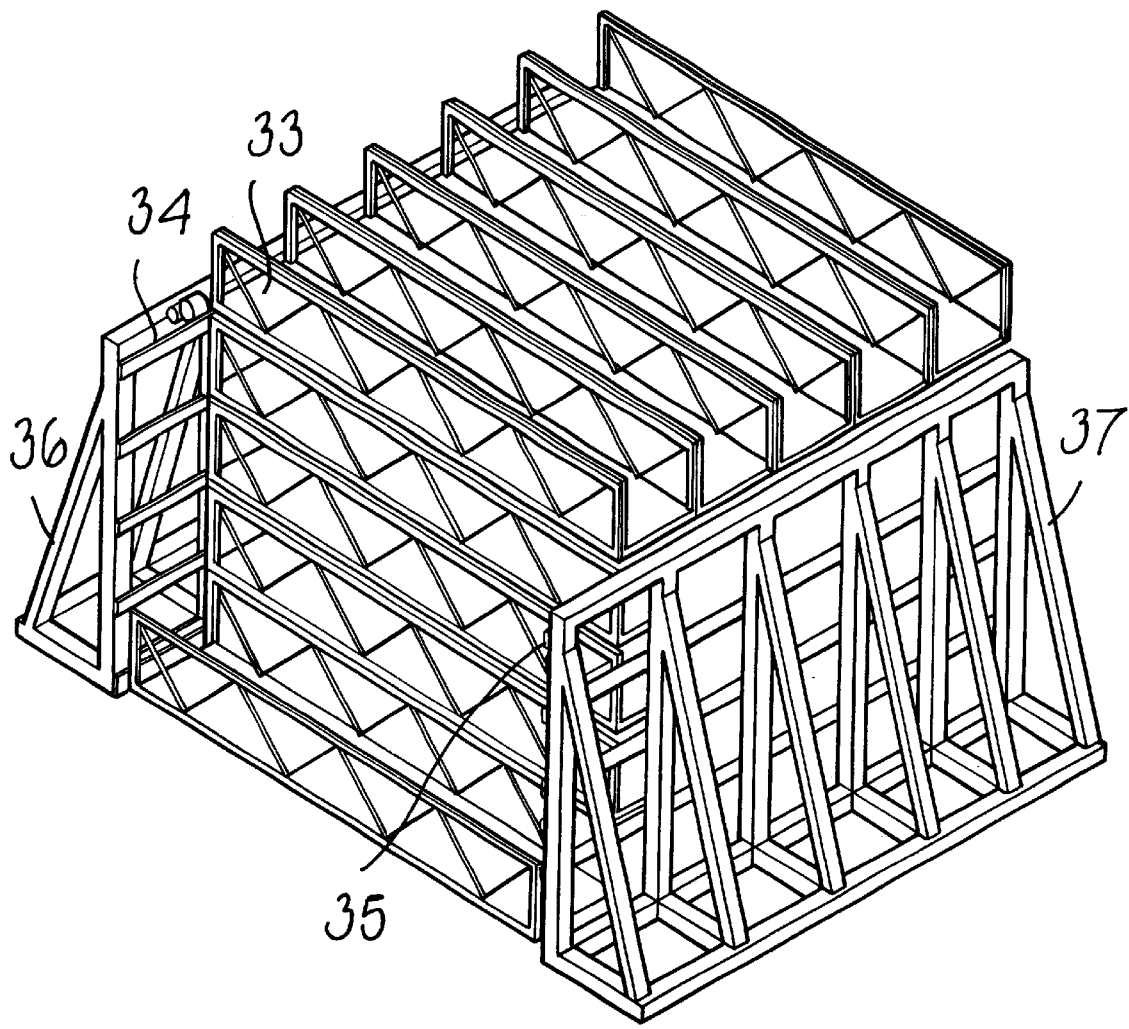
FIG. 4 is a perspective view of a multilevel modular storage system having a different but equivalent structure.
Figure 5:
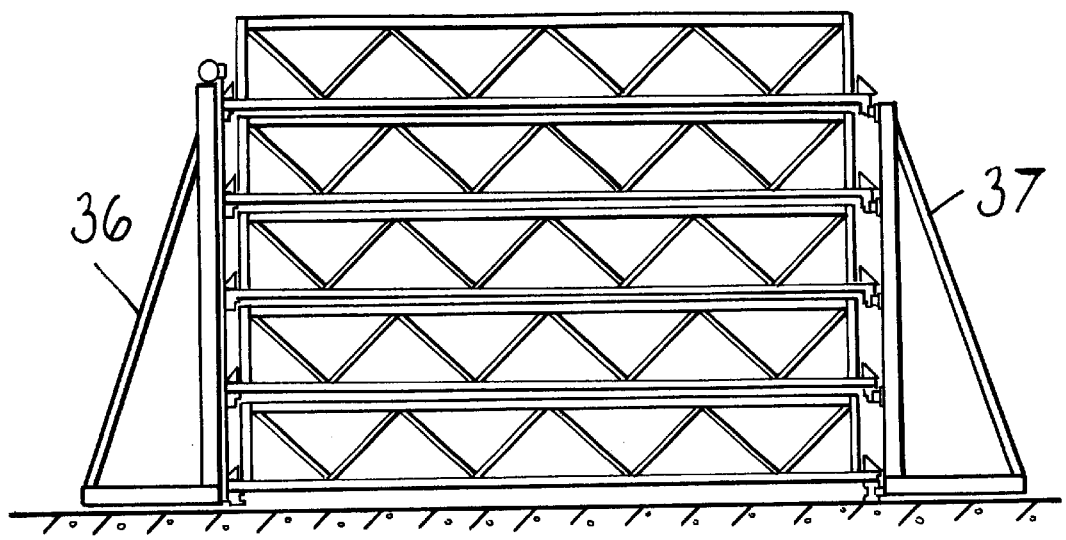
FIG. 5 is a side view of the storage system of FIG. 4.
Figure 6:
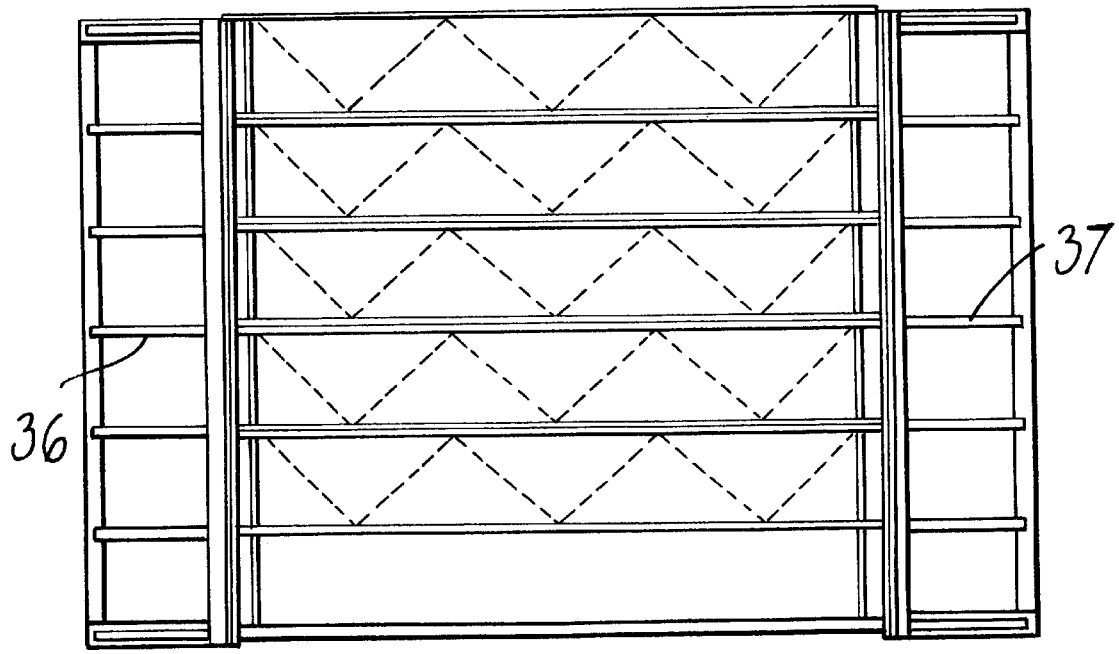
FIG. 6 is a plan view of the storage system of FIG. 4.

FIGS. 4, 5 and 6 are views of a storage system which applies the same inventive concept and in which each module, one of which is designated by the reference numeral 33 by way of example, has both ends supported by sliding rails, now designated by the reference numerals 34 and 35.

The rails are, in this case, supported by two supporting structures 36 and 37 which allow to have a storage system which does not require a supporting wall or a floor.

In any case, the concept of the modules and of their movement for accessing each one remains unchanged.

FIGS. 7 and 8 are respectively a general side view and a general front view of the module movement means.

The assembly consists of a frame composed of vertical uprights 38 and horizontal cross-members 39 providing a grid which corresponds to the set of levels on which the movable modules are arranged.

The set is supported and guided, in an upward region and in a downward region, by two main rails 41 and 42, on each of which a longitudinal rack, designated by the reference numerals 43 and 44 respectively, is mounted.

A motor assembly 45 is fitted in the upper part of the upright 39 and has a gearmotor 46 which drives an upper pinion 47 which meshes on the rack 43.

A second pinion 49 is keyed on the same shaft 48 of the pinion 47 that protrudes from the gearmotor 46, and a chain 50 meshes thereon and reaches the lower part of the upright 39.

In the lower part of the upright 39 a second pinion 51 is provided on which the chain 50 meshes; its shaft 52 actuates an additional pinion 53 which acts on the rack 44.

This type of kinematic system allows the synchronous movement of the pinions 47 and 53, so that the translatory motion of the upright 39 always occurs so that its vertical position remains unchanged.

The horizontal cross-members 39 support a plurality of pistons 54, one for each module, of the pneumatic and hydraulic type.

Depending on whether the stem 55 of the piston is retracted or extended, in which case, as shown in FIG. 11, it engages a bush 56 supported by a protrusion 57 rigidly coupled to a module now designated by the reference numeral 58 in FIG. 11, said stem determines its translatory motion or lack thereof.

Figure 10:
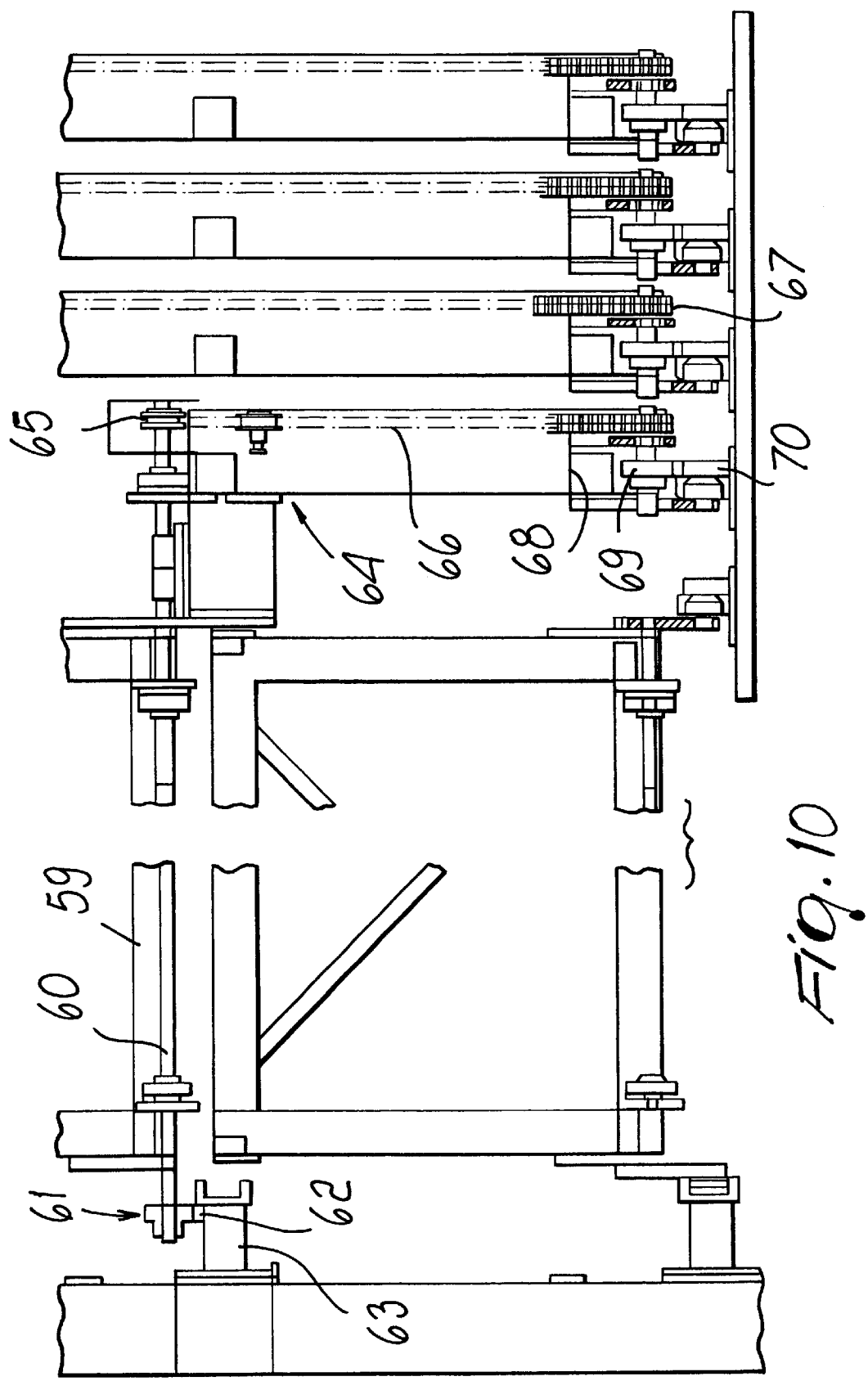
FIG. 10 is a partially sectional side view of the means for the translatory motion of the modules.

The movement of the modules must not cause oscillations of the modules and FIG. 10 illustrates the devices that show how this occurs.

Taking as reference the module that is now designated by the reference numeral 59, said module is provided with a longitudinal shaft 60 having, at its end, a pinion 61 which engages one of the racks, now designated by the reference numeral 62, which as mentioned is rigidly coupled to one of the cross-members, now designated by the reference numeral 63.

The shaft 60 extends longitudinally through the entire module 59 and also through the horizontal part of the L-shaped protrusion, now designated by the reference numeral 64.

The shaft ends with a pinion 65 on which a chain 66 meshes; the chain meshes, in a downward region, with a second pinion 67 which supports a pinion 68 which meshes with a rack 69 rigidly coupled to the ground rail, now designated by the reference numeral 70.

In this manner, the movement of the module 59 is synchronous, and uncoordinated movements, which might lead to oscillations and tipping of the module and of the load deposited on it, are not possible.

In the upper part, each one of the cross-members supports, as shown more clearly in FIGS. 10, 11 and 12, C-shaped longitudinal profiles, designated by the reference numeral 71 in FIG. 11, inside which a wheel 72 slides; the wheel is supported by a protrusion 73 which is rigidly coupled to the module 58 (again with reference to FIG. 11).

The wheels 72 are the ones that support the load of the module 58; since they are contained in a C-shaped profile, and since there are at least two for each module, they prevent off-plane movements of the module 58.

Figure 9:
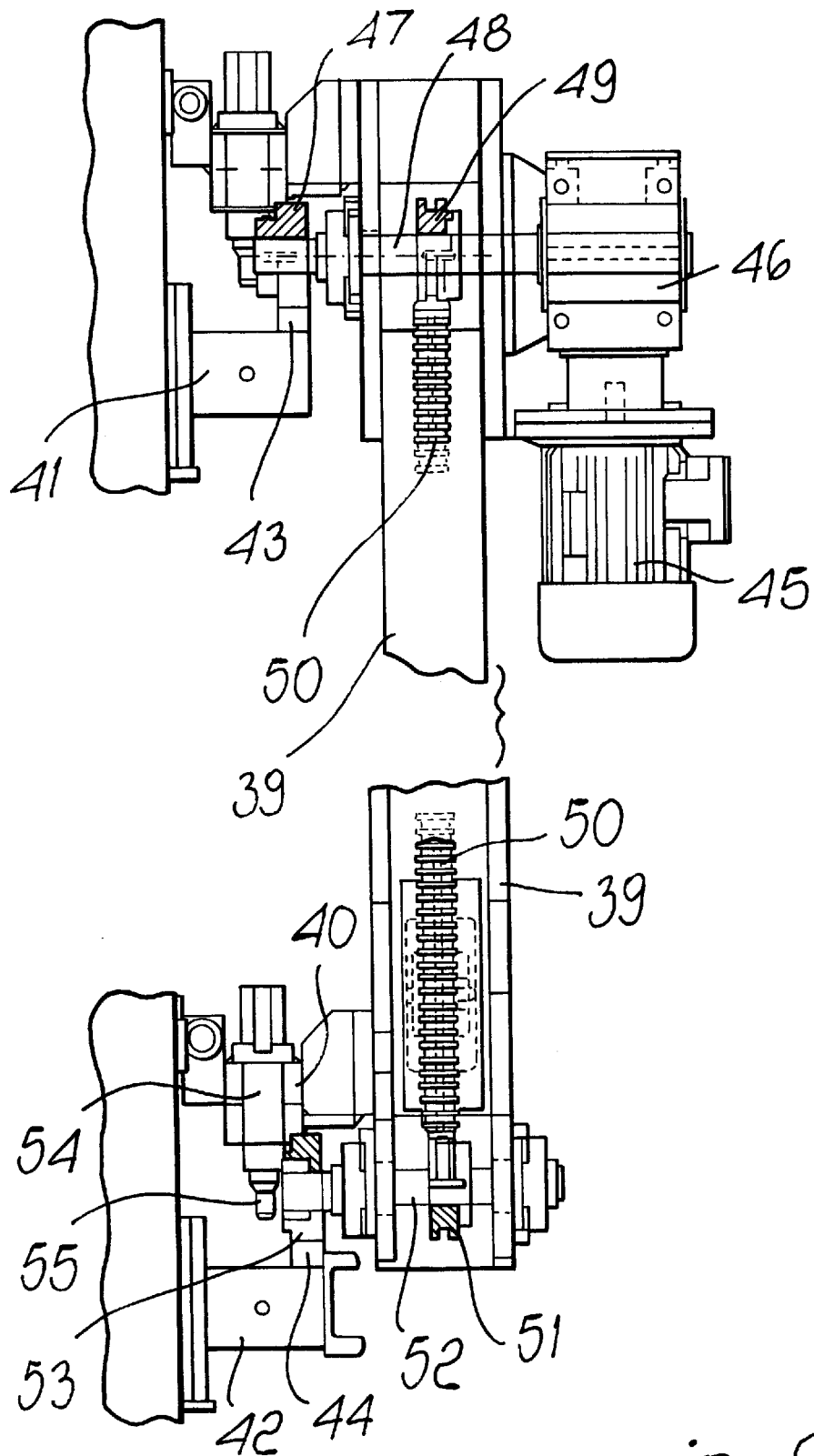
FIG. 9 is a detail view of the means for the translatory motion of the modules.

In order to further avoid unintended movements, a tipping prevention tooth 74 is welded in the already described protrusion 57 and is laterally adjacent to the rack, designated by the reference numeral 43 by analogy with FIG. 9.

This device prevents the translatory motion of the module 58 which might cause the wheel 72 to escape from the profile 71.

A similar tipping prevention system is illustrated in FIG. 12, showing a bearing 75 which provides the same function as the element 74.

On the ground, as shown in particular in FIG. 13, each inverted Lshaped support, now designated by the reference numeral 75, is provided with a carriage 76 whose wheels 77 slide within a C-shaped horizontal profile 78 which prevents the tipping of the supported module.

The assembly of the mechanical elements and devices of the illustrated storage system allows to obtain, by means of a single motor, the translatory motion of sets of modules simply by acting on the pistons for engagement with the translatory system.

By appropriately actuating the pistons, it is possible to allow top and/or front access to any one of the modules that compose the entire storage system.

This allows to have access for loading and unloading the products.

It can be noted that utilization of the space occupied by the storage system is highly efficient, since the intermediate lateral spaces (corridors) between the modules have been eliminated, and it is likewise evident that it is easy to access any point where a certain product has been arranged or is to be arranged.

By appropriately actuating the pistons, the modules are rigidly coupled to the translatory motion system or released therefrom.

This allows to move laterally by one step, i.e., by a space equal to the width of a module, all the modules that lie above the module to which access is sought.

The storage system is served by a computerized system which allows to automate searches for the module of interest and accordingly actuates both the leftward and rightward translatory motion and the activation of the pistons that couple the modules.

Moreover, the storage system is provided with safety devices against possible injury to the operator.

As equivalent variations of the devices of the storage system, it can be convenient, in case of storage of very heavy materials, to provide a plurality of motor drives or motor drive points, without altering the same concepts of synchronization of the movement of the ends of the individual modules.

The motor drive system disclosed in the description is an example and instead of a motor with a gearmotor it is possible to adopt any other type of motor drive, such as fluid-actuated or pneumatic pistons which actuate kinematic systems of different kinds, such as chains, cams, et cetera.

A storage system thus conceived allows efficient and orderly storage of materials of different kinds.

In particular, in the illustrated embodiment, or with elongated rectangular modules, the storage system is ideally suited for storing long and bundled products such as tubes, profiles, rods, and bars made of metal or any other material.

The embodiments that may be assumed in particular by the modules, their supports, the motor drives may be different, without abandoning the scope of the protection of the appended claims, while starting from the same inventive concept.

The disclosures in Italian Patent Application No. PD99A000239 from which this application claims priority are incorporated herein by reference.

What is claimed is:

1. A multilevel modular storage system with modules which can slide horizontally in both directions, comprising a plurality of stacked levels of independent modules arranged side by side, each module having a substantially rectangular elongated shape, said modules being supported, at a first end, by carriages slideable on sliders which are rigidly coupled to a wall or by a structural support and, at a second end, by vertical uprights which are shaped like an inverted L and rest movably on a ground rail, movement means for the translatory motion of said modules being further provided.

2. The storage system according to claim 1, wherein said independent modules have, at the end arranged toward said wall, a carriage with wheels slideable within C-shaped longitudinal sliders which are rigidly coupled to the wall or to said structural support, said wheels having a diameter which is substantially equal to that of an inner part of the C-shaped slider, thus making it impossible for the module to perform movements which are not co-planar.

3. The storage system according to claim 1, wherein bases of said inverted L-shaped uprights are provided with a carriage having wheels which slide within a horizontal C-shaped profile rigidly coupled to a rail which is fixed directly or indirectly to a floor of the room where the storage system is located, said wheels having a diameter which is substantially equal to the diameter of the inner part of the C-shaped profile, thus making non-vertical movements of the upright impossible.

4. The storage system according to claim 1, wherein said inverted L-shaped uprights that support, at ends thereof, the modules of each level have gradually larger horizontal upper wings, so as to allow the modules of one level to slide below the ones of the level that lies above them.

5. The storage system according to claim 1, wherein said movement means are substantially constituted by a set of vertical uprights which are connected to horizontal cross-members, said set of uprights being supported by two horizontal rails which are rigidly coupled to said wall or to said structural support, said rails each having a rack on which a motorized pinion meshes.

6. The storage system according to claim 5, wherein the pinions that mesh respectively on the rack of the rails are kinematically connected so that their movement is synchronous.

7. The storage system according to claim 6, wherein the kinematic connection between said two pinions occurs by way of a chain.

8. The storage system according to claim 1, wherein each module has a shaft which extends through said module along the entire length thereof and has, at an end toward said wall or structural support, a first pinion which meshes on said rack, and a second pinion on a side of the inverted L-shaped upright, said second pinion kinematically transferring a synchronous motion to a third pinion which meshes with a rack which is rigidly coupled to the rail which is fixed to the floor.

9. The storage system according to claim 5, wherein a plurality of engageable and disengageable engagement means are fitted on said movable horizontal cross-members and are suitable to individually couple each module to said cross-members.

10. The storage system according to claim 9, wherein said engagement means are pneumatic or fluid-actuated pistons whose stem can enter bushes, each of which is rigidly coupled to a single module.

11. The storage system according to claim 1, comprising tipping prevention means which are constituted by a tooth rigidly coupled to a tab of a respective module, said tooth moving side by side with respect to said rack of the corresponding slider on the opposite side with respect to a region where the wheels of the carriages of said modules are inserted.

12. The storage system according to claim 1, comprising tipping prevention means are provided being constituted by protrusions, each of which is rigidly coupled to a module, in the region of said end toward said wall, said protrusions having a bearing which follows the respective rack on the opposite side with respect to a region where the wheels of the carriages of said modules are inserted.

13. The storage system according to claim 5, wherein said pinion that produces the translatory motion of the vertical uprights and of the horizontal cross-members is actuated by an electric motor with a gearmotor.

14. The storage system according to claim 5, wherein the motor drive system that produces the translatory motion of the vertical uprights of the horizontal cross-members is achieved by means of hydraulic and/or pneumatic means which actuate kinematic systems of the chain or cam type.

* * * * *